May 15, 1956 D. M. HARVEY 2,745,396
TOP CYLINDER LUBRICATOR
Filed Jan. 27, 1951 3 Sheets-Sheet 1
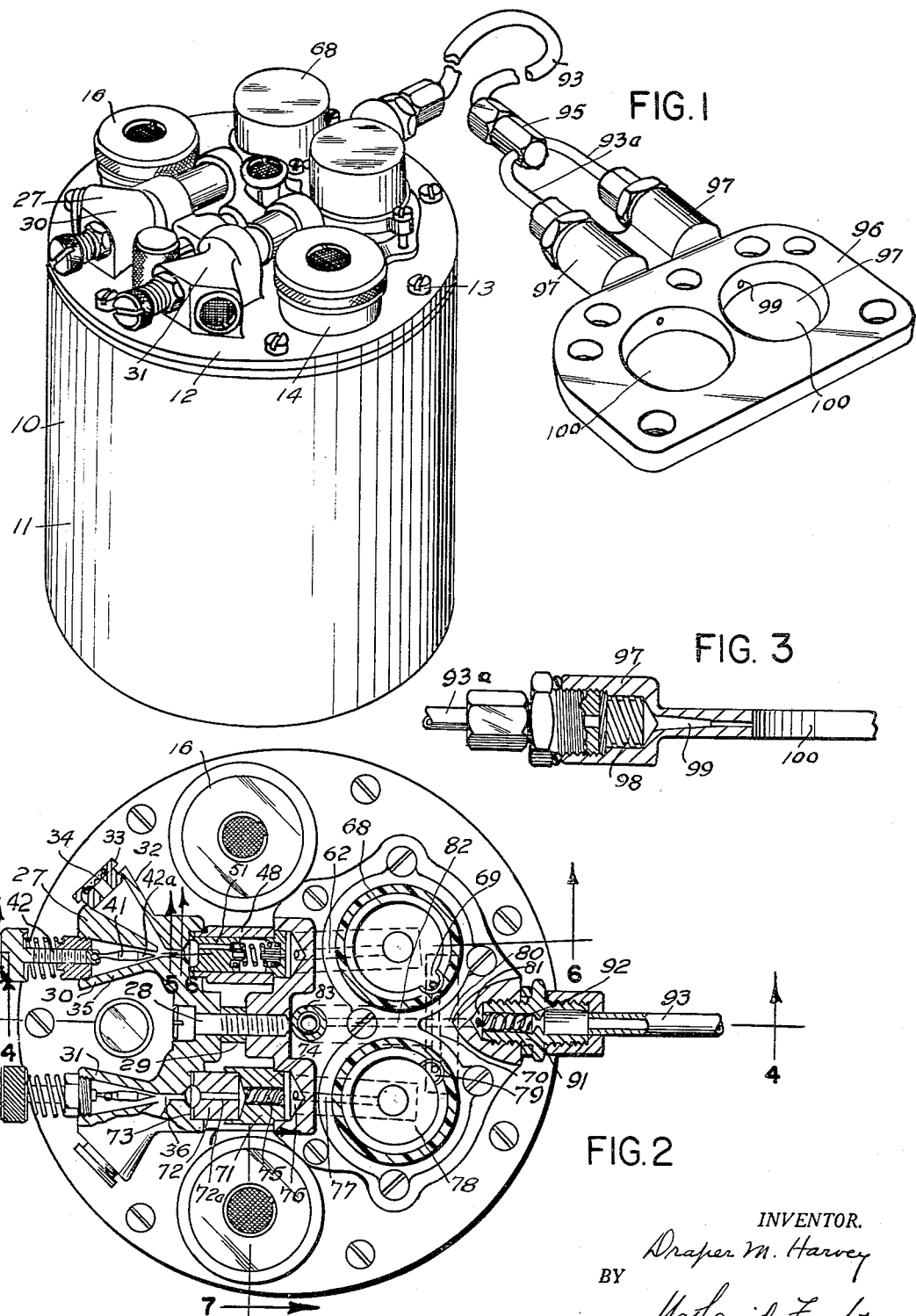
INVENTOR.
Draper M. Harvey
BY
Nathaniel Frucht
ATTORNEY

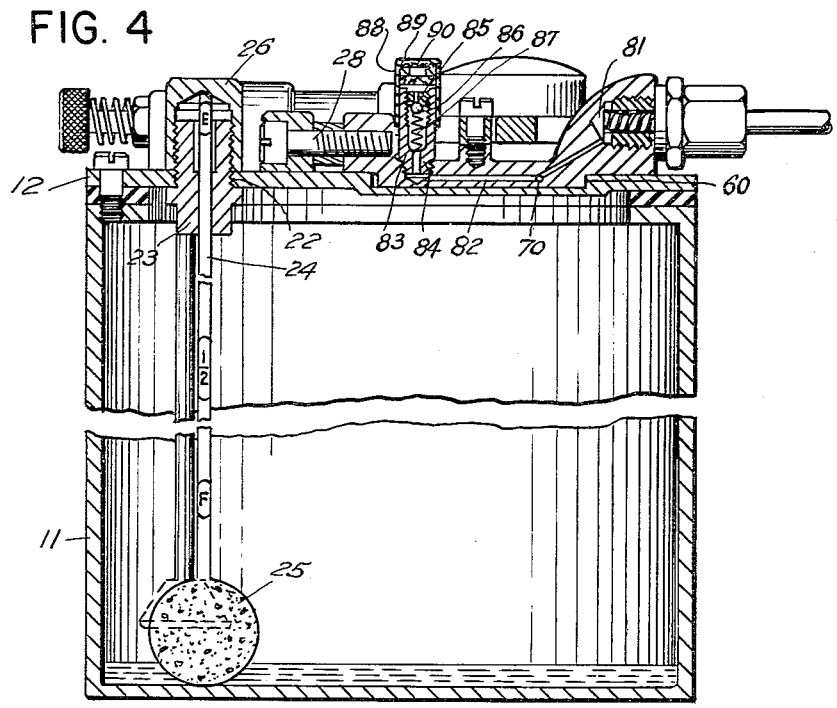
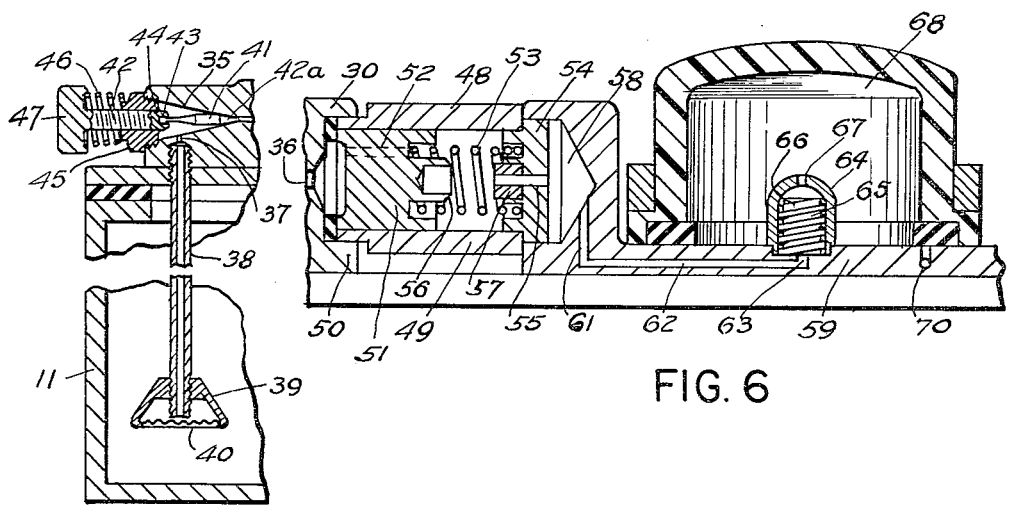

United States Patent Office 2,745,396
Patented May 15, 1956

2,745,396
TOP CYLINDER LUBRICATOR

Draper M. Harvey, Hingham, Mass., assignor to Automotive & Marine Products Corporation, a corporation of Massachusetts Application January 27, 1951, Serial No. 208,195

4 Claims. (Cl. 123—196)

The present invention relates to automotive engine operation, and has particular reference to a novel control system for supply of top lubricant.

The principal object of the invention is to ensure an adequate supply of top lubricant spray under all conditions of engine operation.

Another object of the invention is to compensate for vacuum changes in an engine manifold and maintain a steady flow of lubricant to the manifold.

A further object is to provide lubricator supply controls which operate under both high and low vacuum conditions.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Fig. 1 is a perspective view of an illustrative top lubricator embodying the invention;

Fig. 2 is a top plan view thereof, parts being shown in section;

Fig. 3 is an enlarged section of one atomizing and injecting portion of the bracket plate of Fig. 1;

Fig. 4 is a vertical section, partly broken away, on the line 4—4 of Fig. 2;

Fig. 5 is a vertical section on the line 5—5 of Fig. 2;

Fig. 6 is a vertical section on the line 6—6 of Fig. 2;

It has been found desirable to provide a top lubricator for automotive engines, which will deliver an atomized stream of lubricating oil under constant pressure to an engine manifold, despite variations or pressure changes within the engine manifold. To this end, I have devised a construction which has a one flow channel for a mixture of air and regulated oil, and a second flow channel for a second mixture of air and regulated oil, the channels being adjusted for different suction conditions, the two mixtures being vaporized or atomized under uniform pressure and then conveyed to a bracket plate, for re-vaporization and injection into the path of the engine fuel charge, preferably as a whirling expanding cone.

Figure 7:
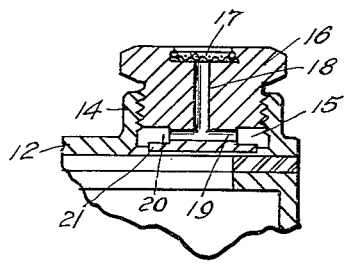
Fig. 7 is an enlarged vertical section on the line 7—7 of Fig. 2.

Referring to the drawings, the top lubricator 10 includes an oil reservoir or container 11 which has a head 12 detachably mounted thereon as by screws or fasteners 13. The head has two annular bosses 14 with central openings 15 through which oil may be supplied to the container, each boss being internally threaded to receive a fill cap 16 which functions as an air inlet, the fill cap, see Fig. 7, being recessed at its upper end to receive an air filter 17 and being provided with a central air passageway 18 which communicates with a cross passageway 19 terminating in an annular recess or groove 20 in the lower portion of the fill cap. The lower end 21 of the groove 20 is reduced in size, whereby filtered air is freely admitted to the interior of the container.

The container head has an opening 22, see Fig. 4, which is threaded to receive a bored nipple 23 in which the stem 24 of a float gage 25 is slidably received, the upper end of the nipple 23 being threaded, and having a screw cap 26 seated thereon, the cap 26 being removable to permit inspection of the float gage.

A venturi block 27 of U-shape form is detachably secured to the head 12, as by a screw 28 which extends through a spacer ring 29, and an oil tube attachment, as hereinafter described, and includes two independent mixers 30, 31 each having a tapered air inlet 32 which has a bored closure cap 33 provided with a filter 34, and a tapered oil inlet 35 through which a regulated volume of oil is drawn to mix with the filtered air in a mixture passageway 36. The oil inlet 35 is shown in detail in Fig. 5; an oil flow passage 37 leads into the inlet 35 and receives oil from the container 11 through a tube 38 which is threaded through the head into the venturi block, the lower end of the tube 38 having a funnel inflow cap 39 threaded thereon which is provided with a screen 40.

The tapering sides of the oil inlet 35 facilitate use of a regulating valve 41 which has a conical control end 42$^a$ conforming to the taper of the oil inlet, the outer end of the valve 41 being universally connected to a regulating stem 42$^a$, as by forming the outer end of the valve 41 as a ball 43 which is rotatably received in a socket 44 in the stem 42. The stem 42 is regulatably threaded in a head 45 threaded or otherwise locked in place to close the oil inlet 35, a coil spring 46 being mounted on the stem 42 between the head 45 and the inner face of the stem cap 47, which is knurled for manual turning, to keep the stem in valve-adjusted position.

The mixer 30, see Fig. 2, is preferably set as a low vacuum mixer, whereas the mixer 31 which is identical in construction with the mixer 30, and is supplied with oil from the container and with air through an air filter in similar fashion, is preferably set as a high vacuum mixer, the vacuum control being obtained by suitable regulation of the oil control valve and the size of the port openings. The mixture passageway 36 for the low vacuum mixer 30 leads to a pressure control unit 48, see Fig. 6, comprising a shell 49 which has its outer end reduced to seat within a flange 50 at the inner end of the mixer 30, a piston 51 being seated in the shell 49 and spring urged towards the mixer 30. The piston 51 is bored as indicated at 52 and has its outer end cup-flanged to receive one end of a coil spring 53 which has its other end received in a cup-flanged inner end of a closure plate 54, which is also bored as indicated at 55. The piston cup-shaped flange includes a central annular valve portion 56 which moves towards and away from an annular seat 57 in the closure plate as the suction changes, whereby the piston moves to control flow through the bore 55 in response to variations in suction pressure to maintain pressure on the oil and air mixture passing through.

Figure 8:
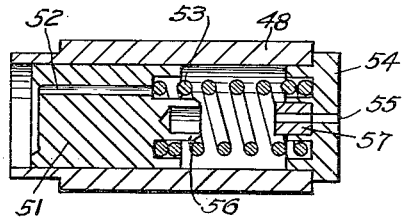
Fig. 8 is a sectional detail of a modified low pressure flow control assembly.
Figure 9:
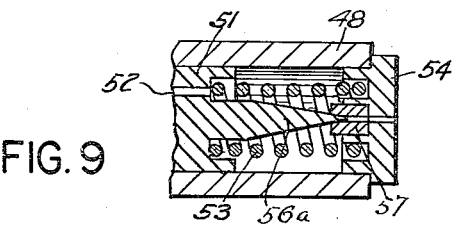
Fig. 9 is a sectional detail of a modification of Fig. 8.

The pressure cylinder shown in enlarged form in Fig. 8 may, if desired, have its outer valve end formed as a tapered terminal portion 56a to cooperate with the annular valve seat 57, see Fig. 9.

The closure plate 54 seats in an inlet 58 of a spray chamber unit having a base plate 59 which has flow conduits as hereinafter described, seated in a recess 60 in the head, the base plate being attached to the head by screws or the like, and the screw 28 threadedly seating in a suitable boss in the plate. A flow passage 61 leads from the inlet 58 to a flow conduit 62, which terminates in an opening 63 leading to an injector housing 64, in which a whirl cylinder 65 is seated; the whirl cylinder has a helical groove 66, which may if desired be in the form of a double helix, whereby the entering oil and air mixture traverses a helical path to emerge as a thoroughly mixed whirling spray through an outlet opening 67 into a mixture spray chamber 68, which preferably is of transparent material. The thoroughly mixed spray now exits through a side opening 69 into one end of a cross conduit 70 in the base plate 59.

Figure 10:
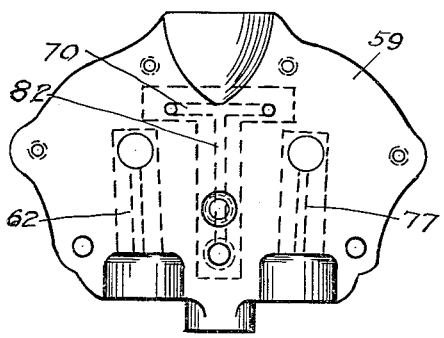
Fig. 10 is a plan view of the vapor chamber plate.
Figure 11:
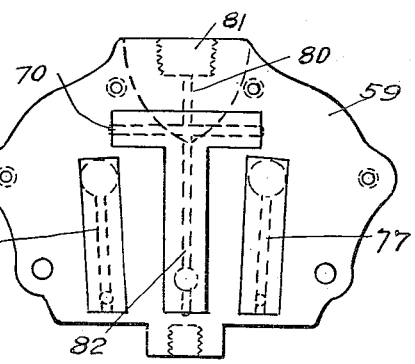
Fig. 11 is a bottom view thereof, the flow grooves being shown in dotted lines.
Figure 12:
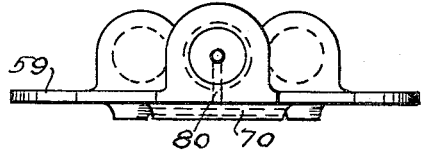
Fig. 12 is an end view thereof.

Referring now to Fig. 2, air and oil mixture from the high vacuum mixer 31 is conducted to a high vacuum flow control unit 71, which includes a block 72 seated in a recess 73 in the outer end of the mixer 31, the block 72 having a flow bore 72a with an enlarged entrance, and being seated in a whirl element 74 which has a flanged inner portion to receive the block 72 and includes a whirl passageway 75, the oil and air mixture exiting into an inlet 76 which receives the outer reduced end of the block 74, and conducts the oil and air mixture to a conduit 77 which leads upwardly into a spray chamber 78 of similar construction to the spray chamber 68, the thoroughly mixed spray exiting through a side opening 79 into the other end of the cross conduit 70. The cross conduit 70 communicates with a centrally disposed passageway 80 with an outlet chamber 81, see Figs. 10, 11 and 12.

It is desirable to maintain the pressure in the outlet chamber 81, despite variations in the suction pressure applied to the outlet chamber from the engine manifold. To this end, a conduit 82 conveys air to the cross conduit 70 from a pressure regulated air inlet 83, see Fig. 4, the inlet having a bored shell 84 which is threaded into the head and is internally threaded to receive a bored washer 85 which may be adjusted by threading in or out. A ball check valve 86 seats against the bore of the washer 85 and is spring pressed upwardly by a spring 87, the shell 84 having a cap 88 with an air inlet 89 and an associated screen 90. Any drop in pressure in the oil and air mixture outlet chamber 81 shifts the ball check valve 86 downwardly against the spring 87 and permits inflow of air through the air inlet 83 to keep the pressure relatively constant.

The outlet chamber 81 has a nipple 91 threaded therein, see Fig. 2, a screw thread whirl 92 being preferably mounted in the inner end of the nipple, and a line connection 93 is attached to the outer end of the nipple to convey the oil and air spray to a line conduit 94 and through a connection 95, and tubing 93a, see Fig. 1, to a manifold bracket plate 96 for injection into the fuel and air charge. The bracket plate may have one or more inflow chambers 97, see Fig. 3, it being preferred to include a spiral whirl 98 of single or double helical threads in each inflow chamber, whereby the oil-air spray is whirled and thoroughly vaporized, to emerge through a spray nozzle 99 into at least one flow channel 100 and across the fuel and air charge passing therethrough.

The operation of the novel top lubricator is now clear. Two separate flows of oil-air mixture are provided, one flow being regulated for low pressure and the other flow being regulated for high pressure conditions. The two flows are thoroughly vaporized, and are then joined and pass to an outlet chamber, the pressure in the outlet chamber being maintained by regulated addition of pressure air. The mixture is then conducted to a bracket plate, wherein the air and oil are whirled and the vaporized oil thoroughly remixed with the air to provide a whirling vaporized oil stream, which is injected into the engine manifold across the fuel and air charge.

The lubricator may be readily adapted for two fluid injections, by forming the container 11 as a duplex unit, as by mounting a vertical wall to provide two compartments, and providing a float gage for each compartment. This permits the injection of a mixture of top cylinder oil and a chemical treatment fluid or the like.

Although I have described a constructional embodiment of the invention, it is obvious that changes in the size, shape, and arrangement of the parts may be made to suit different top lubrication requirements, without departing from the spirit and the scope of the invention as defined in the appended claims.

I claim:

1. In a top cylinder lubricator, a fluid-air mixer, means for supplying the mixer with fluid and air, the fluid supply means for said mixer including a regulatable control valve, a mixture spray chamber, a conduit for conducting fluid-air mixture from the mixer to the spray chamber, means in said conduit for whirling the fluid air mixture in a helical flow path, a second fluid-air mixer, means for supplying the second mixer with fluid and air, the fluid supply means for the second mixer including a regulatable control valve, a second mixture spray chamber, a conduit for conducting fluid-air mixture from the second mixer to the second spray chamber, means in said second conduit for whirling the fluid air mixture in a helical flow path, an outflow line connection, and a conduit for conducting the mixtures from the two spray chambers to the outflow line connection.

2. In the combination of claim 1, said conduit to the outflow line connection having an air inlet with a regulatable air inflow control valve.

3. In the combination of claim 2, said air inflow control valve comprising a spring pressed check valve.

4. In the combination of claim 2, one of said conduits for conducting fluid-air mixture to a spray chamber having a suction pressure responsive flow control mechanism.

References Cited in the file of this patent

UNITED STATES PATENTS

| 1,719,191 | Mulligan | July 2, 1929 |
| 1,833,913 | Ross | Dec. 1, 1931 |
| 1,991,722 | Berray | Feb. 19, 1935 |
| 2,053,200 | Miller | Sept. 1, 1936 |
| 2,086,313 | Clementson | July 6, 1937 |
| 2,457,389 | Maclay | Dec. 28, 1948 |
| 2,541,129 | Taber | Feb. 13, 1951 |

FOREIGN PATENTS

| 819,274 | France | July 5, 1937 |
| 867,380 | France | July 21, 1941 |
| 867,940 | France | Sept. 8, 1941 |